March 18, 1947.   F. B. RAY   2,417,567
HOOK ROLLER MOUNTING FOR ROTARY CRANES
Filed Oct. 5, 1945   2 Sheets-Sheet 1
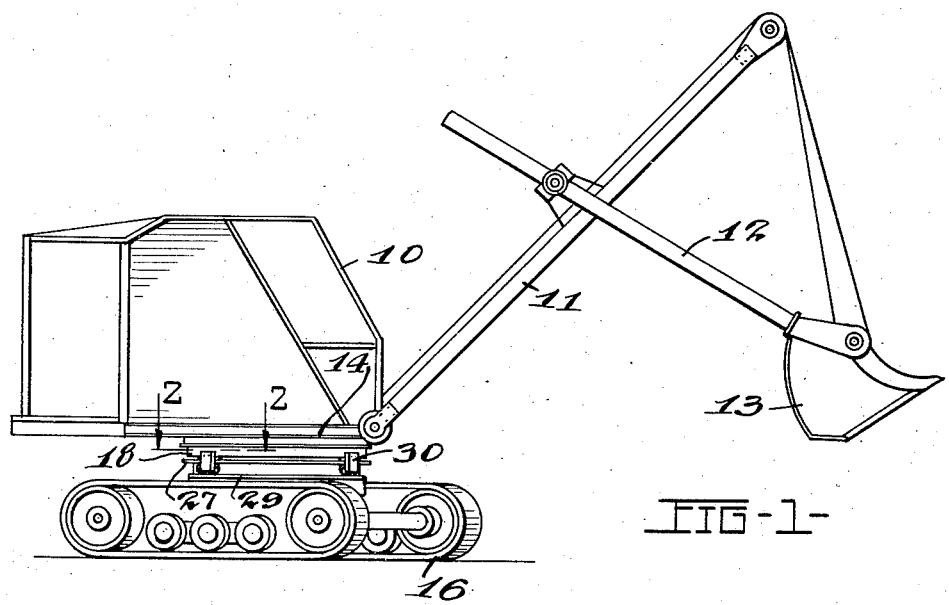
FIG-1-
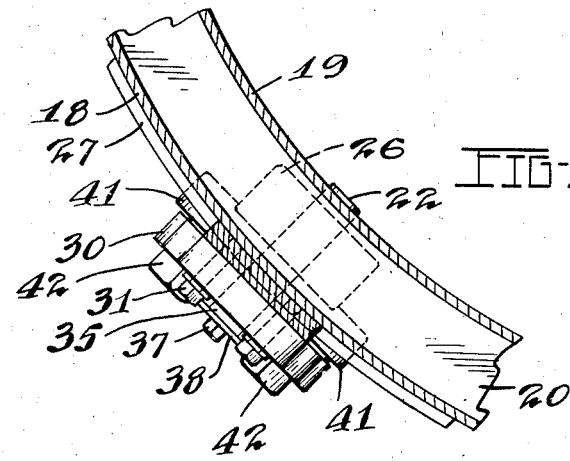
FIG-2-
INVENTOR
FRED B. RAY
BY
ATTORNEY March 18, 1947. F. B. RAY 2,417,567
HOOK ROLLER MOUNTING FOR ROTARY CRANES
Filed Oct. 5, 1945 2 Sheets-Sheet 2
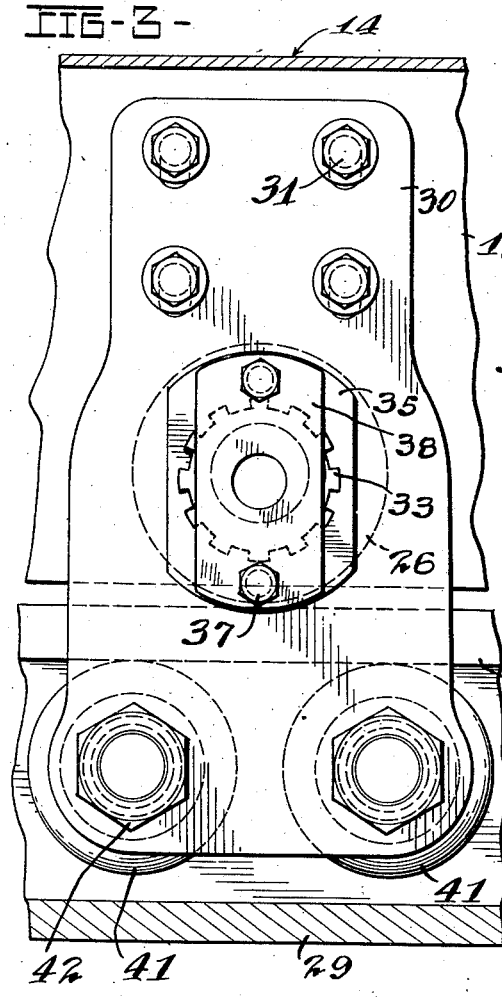
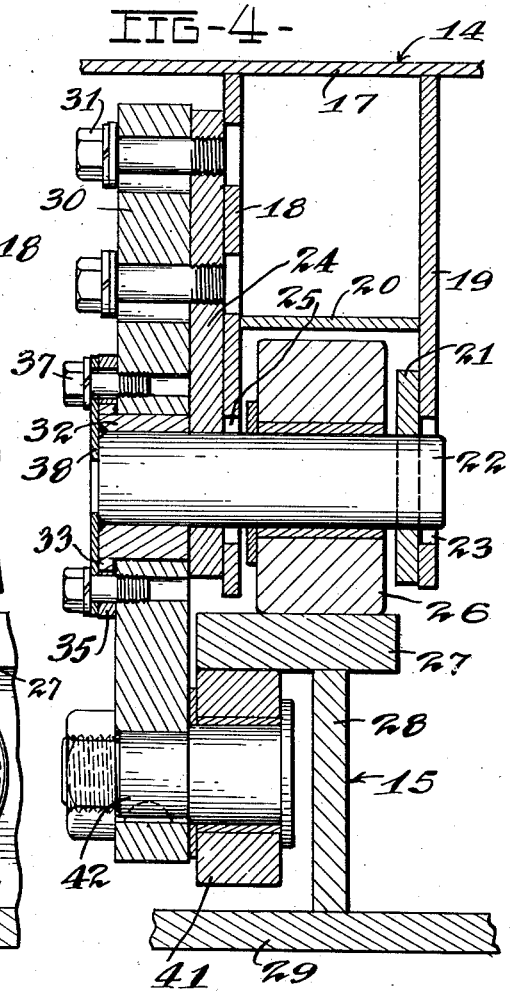
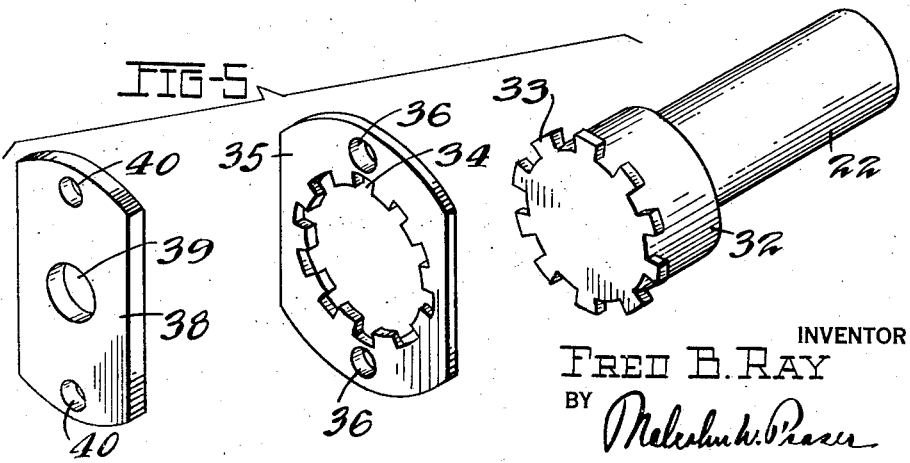
INVENTOR
FRED B. RAY
BY
ATTORNEY Patented Mar. 18, 1947

2,417,567

UNITED STATES PATENT OFFICE 2,417,567

HOOK ROLLER MOUNTING FOR ROTARY CRANES

Fred B. Ray, Indianapolis, Ind., assignor to Insley Manufacturing Corporation, Indianapolis, Ind., a corporation of Indiana Application October 5, 1945, Serial No. 620,557

5 Claims. (Cl. 308—222)

This invention relates to hook roller assemblies such as are ordinarily carried by the rotatable platform or turntable of cranes, shovels and the like, to engage the relatively stationary supporting structure.

It is common practice in connection with crawler cranes, shovels, drag lines and the like employing a rotatable platform or turntable carrying the cab, machinery, etc., to provide hook roller arrangements which are usually carried by the turntable to engage the under side of the circular track of the supporting structure in order to maintain the desired relation between the turntable and supporting structure during the rotary movements of the turntable. It is a desideratum to provide a simple and efficient mounting for the hook roller assembly so that adjustment thereof may be conveniently made not only to compensate for wear but also for inaccuracies in machining the various parts so that the turntable is properly supported and is enabled to rotate smoothly in the desired manner.

An object is to produce a new and improved mounting for the hook roller assembly which is simple in construction, easy to adjust and is sturdy and reliable in order to withstand the hard use to which it is subjected.

Other objects and advantages will hereinafter appear and for purposes of illustration but not of limitation, an embodiment of the invention is shown on the accompanying drawings in which Figure 1 is a front perspective view of a crawler mounted shovel in which the cab and operating mechanism are mounted on a rotary platform or turntable;

Figure 2 is an enlarged fragmentary sectional view substantially on the line 2—2 of Figure 1;

Figure 3 is an enlarged fragmentary side elevation of a hook roller assembly and associated parts;

Figure 4 is a vertical sectional elevation of the hook roller assembly and associated parts shown on Figure 3; and Figure 5 is a perspective view of the keeper and lock plates and associated top roller shaft.

The illustrated embodiment of the invention comprises a power shovel which includes a cab 10, housing the usual operating machinery and shovel assembly including the conventional boom 11, dipper stick 12 and bucket assembly 13. The cab is mounted on a suitable platform 14 which in turn is rotatably mounted on a supporting structure 15 which is carried and propelled by the usual crawlers 16. As is customary in machines of this character, the cab and associated parts are mounted for rotary movement, and for this purpose, a gear and pinion arrangement is provided, the pinion being driven from the machinery housed within the cab. Since this mechanism is old in the art and forms no part of the present invention, detail illustration and description are not considered necessary.

In this instance, the platform or turntable 14 includes a horizontally disposed platform member 17, to the under side of which depends a pair of vertically disposed spaced plate-like frame members 18 and 19 which are braced intermediate their ends by a horizontally disposed frame member 20. Suitably fixed to the outer side of the depending frame member 19 is a plate 21 which is apertured to receive a relatively short pin or shaft 22, the end of the shaft projecting through an aperture 23 in the depending frame member 19. The opposite end portion of the shaft 22 rotatably fits an aperture in a plate 24 which is fixed as by welding to the outer face of the depending frame member 18. The shaft extends through an opening 25 in the frame member 18. Rotatable upon the shaft 22 is a roller 26 which has rolling contact with the flat surface formed on the upper side of a horizontally disposed plate 27 which forms part of the supporting structure 15. The plate member 27 is mounted upon a vertically disposed frame member 28 which in turn is fixed upon a horizontal frame member 29 of the supporting structure 15. It will be noted that the upper frame member 27 projects laterally of the vertical frame member 28 to provide a circular track for engagement by the hook rollers as will hereinafter appear.

The hook roller assembly comprises a bracket plate 30 which is formed at its upper portion with a series of vertically elongate holes to receive cap screws 31 for securing the plate 30 to the plate 24 and to enable vertical adjustment of the bracket plate 30 upon loosening the cap screws. In the region of the outer end portion of the roller shaft 22, the bracket plate 30 is formed with an opening 31' which is eccentric to the axis of the shaft 22, and secured as by welding to the outer end of the shaft 22 is an eccentric collar 32 which rotatably fits the eccentric opening 31'. The outer end of the collar 32 is splined as indicated at 33 and fitting such splined end portion is a splined aperture 34 of a lock plate 35. The lock plate 35 is formed with a pair of vertically spaced apertures 36 to receive cap screws 37 which threadedly engage the bracket plate 30. Abutting against the end of the roller shaft 22 to prevent endwise movement thereof is a keeper plate 38 which has a central aperture 39 and screw-receiving apertures 40. The same screws 37 pass through the apertures 40 so that they not only hold the lock plate 35 in place, but also the keeper plate 38.

The bracket plate 30 extends downwardly beyond the track forming frame member 27 and carries a pair of hook rollers 41 which are mounted on a suitable shaft 42 and engage the under face of the track member 27. Thus the hook rollers 41 cooperate with the roller 26 for maintaining the platform 14 in the desired position and facilitating rotative movement thereof.

In practice in order to effect adjustment of the hook rollers 41 toward and away from the track on the under side of the frame member 27, the cap screws 31 are loosened and the cap screws 37 are removed along with the keeper plate 38. Then by use of a suitable tool applied to the flat sides of the lock plate 35, the collar 32 as well as the shaft 22 may be turned in one direction or the other, thus to move the hook rollers closer to or away from their track, thus compensating for inaccuracies in machining or for wear. After the proper adjustment is made, the cap screws 31 are tightened to hold the bracket plate in position. The keeper plate is then replaced and the cap screws 37 are tightened.

From the above description, it will be manifest that I have produced an exceedingly simple mounting and adjustment for the hook roller assemblies. The assembly is exceedingly sturdy and reliable and the time and effort necessary to effect the desired adjustment are reduced to a minimum. By utilizing the shaft supporting the upper roller in this connection, the number of parts is kept as small as possible and a very efficient and positive adjusting and locking means is afforded.

It is to be understood that numerous changes in details of construction, arrangement and operation may be effected without departing from the spirit of the invention especially as defined in the appended claims.

What I claim is:

1. A hook roller mounting for cranes or the like having a rotatable platform member mounted on a supporting member provided with an annular track for engagement by the hook roller, said mounting comprising a bracket carried by the platform member, a shaft projecting from the platform member, an eccentric collar on said shaft and rotatively fitting said bracket, means for normally holding said collar from rotative movement, and a hook roller in fixed axial relation on said bracket, whereby rotative adjustment of said eccentric collar moves the hook roller toward or away from the annular track.

2. A hook roller mounting for cranes or the like having a rotatable platform member mounted on a supporting member provided with an annular track for engagement by the hook roller, said mounting comprising a bracket carried by the platform member, a shaft carried by the platform member, an eccentric collar on said shaft and rotatively fitting said bracket, a splined end portion on said collar, a plate having a splined aperture fitting said splined end portion, fasteners for securing said plate to the bracket, and a hook roller on said bracket whereby removal of said fasteners enables turning of said plate to effect adjustment of the hook roller relative to the annular track.

3. A hook roller mounting for cranes or the like having a rotatable platform member mounted on a supporting member provided with an annular track for engagement by the hook roller, said mounting comprising a bracket carried by the platform member, a shaft carried by the platform member, a roller on said shaft engaging one surface of the annular track, an eccentric collar on said shaft and rotatively fitting said bracket, a splined end portion on said collar, a plate having a splined aperture fitting said splined end portion, fasteners for securing said plate to the bracket, and a hook roller on said bracket engaging the opposite surface of the track, whereby removal of said fasteners enables turning of said plate to effect adjustment of the hook roller relative to the annular track.

4. A hook roller mounting for cranes or the like, having a rotatable platform member mounted on a supporting member provided with an annular track for engagement by the hook roller, said mounting comprising a bracket carried by the platform member, a horizontally disposed shaft rotatively carried by the platform member, a roller rotatable on said shaft and engaging one surface of the annular track, an annular collar eccentrically fixed to said shaft and rotatively fitting said bracket, a splined end portion on said collar, a plate having an aperture fitting said splined portion and abutting against said bracket, fasteners securing said plate to said bracket, and a hook roller on said bracket engaging the opposite surface of the track, whereby upon removal of the fasteners and turning the plate in one direction or the other, the hook roller may be adjusted toward or away from the adjacent track surface.

5. A hook roller mounting for cranes or the like, having a rotatable platform member mounted on a supporting member provided with an annular track for engagement by the hook roller, said mounting comprising a bracket carried by the platform member, means for fastening said bracket to the platform member including elongate holes in the bracket to enable adjusting movement of same, a horizontally disposed shaft rotatively carried by the platform member, a roller rotatable on said shaft and engaging one surface of the annular track, an annular collar eccentrically fixed to said shaft and rotatively fitting said bracket, a splined end portion on said collar, a plate having an aperture fitting said splined portion and abutting against said bracket, fasteners securing said plate to said bracket, a keeper plate for preventing endwise movement of said collar and secured in place by said fasteners, and a hook roller on said bracket engaging the opposite surface of the track, whereby upon removal of the fasteners and turning the plate in one direction or the other, the hook roller may be adjusted toward or away from the adjacent track surface.

FRED B. RAY.

REFERENCES CITED

The following references are of record in the file of this patent:

UNITED STATES PATENTS

| Number | Name | Date |
|---|---|---|
| 2,363,860 | Gentry | Nov. 28, 1944 |
| 1,969,871 | Bernhard | Aug. 14, 1934 |
| 2,128,949 | Knox | Sept. 6, 1938 |
| 2,098,237 | Hailey | Nov. 9, 1937 |
| 2,366,558 | Rauch | Jan. 2, 1945 |